Feb. 11, 1969   H. A. FAERBER   3,426,705
DEPOSITOR
Filed June 8, 1966   Sheet 1 of 5

INVENTOR
HANS ARTHUR FAERBER

BY Browne, Schuyler &
Beveridge
ATTORNEYS

Feb. 11, 1969    H. A. FAERBER    3,426,705
DEPOSITOR
Filed June 8, 1966
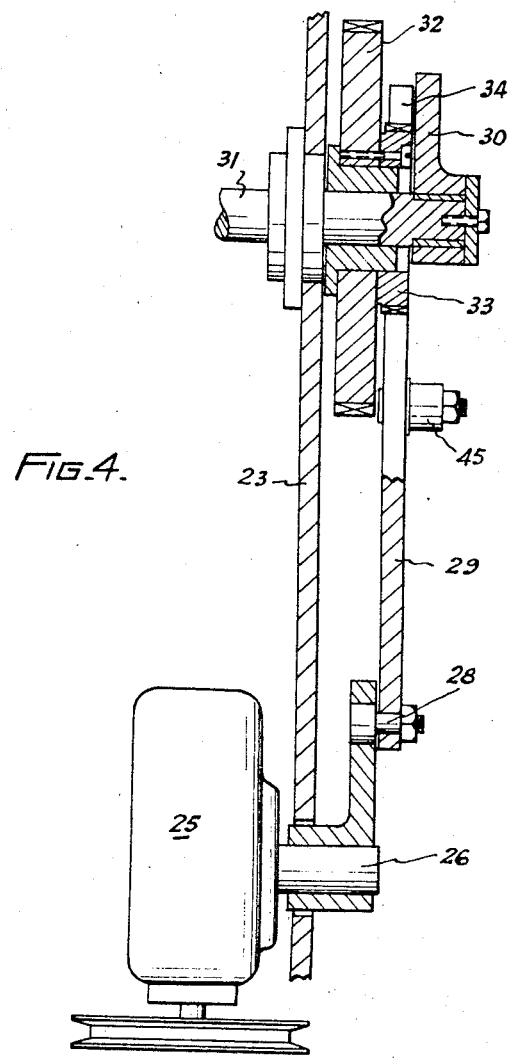
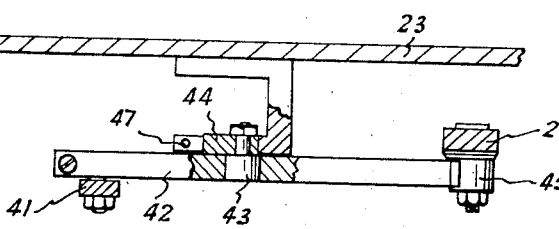
INVENTOR
HANS ARTHUR FAERBER
BY  Browne, Schuyler & Beveridge
ATTORNEYS

INVENTOR
HANS ARTHUR FAERBER

INVENTOR
HANS ARTHUR FAERBER
BY Browne, Schuyler & Beveridge
ATTORNEYS

United States Patent Office

3,426,705
Patented Feb. 11, 1969

3,426,705
DEPOSITOR
Hans Arthur Faerber, Castle Cove, New South Wales, Australia, assignor to Nid Pty. Limited, Alexandria, near Sydney, New South Wales, Australia, a corporation of New South Wales, Australia
Filed June 8, 1966, Ser. No. 556,037
U.S. Cl. 107—15          9 Claims
Int. Cl. A21c 11/18; A23g 5/02; A01j 21/00

ABSTRACT OF THE DISCLOSURE

An apparatus for dispensing successive measured quantities of a plastic or semi-liquid material from a supply thereof. A cylinder block having a bore therein is mounted for movement to alternately position the bore in communication with the supply and in a dispensing position. A piston is mounted within the bore, and a rack and pinion drive is provided to reciprocate the piston within the bore to alternately receive and dispense the material.

---

This invention relates to apparatus for depositing discrete charges of material drawn from a bulk supply or source thereof.

More particularly, the invention relates to such apparatus for use with materials which may be described as semi-solids, that is to say, very viscous liquids, pastes, creams and the like.

The invention was devised primarily for the deposition of edible semi-solids in the nature of confectionery and is described hereinafter as applied to the deposition of confectionery materials; it being understood that depositions according to the invention may be applied to other purposes.

The depositing of discrete charges of semi-solids has always presented difficulties because of the tendency such materials have to coagulate in any narrow passages or ducts and to impede the operation of such devices as non-return valves and the like customarily found in conventional depositors. Those difficulties are greatly increased in those instances in which solid particles or fragments are mixed with the semi-solid material as often happens in the manufacture of confectionery when fruit, crushed toffee or other hard candy particles, nut kernels and the like are provided in chocolate or other semi-solid carriers. It is a feature of depositors according to the invention that they are satisfactory for the deposition of discrete charges of semi-solid materials containing solid particles or the like.

The invention consists in a depositor comprising a reservoir for material to be deposited, a stationary ported element defining a reservoir port communicating with the interior of the reservoir and a discharge port, a movable cylinder block defining a pumping cylinder of which one end is open to a surface of the cylinder block making sliding contact with said ported element, block moving means to shift said cylinder block intermittently in a manner such that it alternates between an intake position wherein said one end of the cylinder communicates with said reservoir port and a discharge position wherein said one end of the cylinder communicates with said discharge port, and piston operating means to shift said piston away from the reservoir port when the cylinder block is in the intake position and towards the discharge port when the cylinder block is in the discharge position.

According to preferred embodiments of the invention, the stationary ported element is in the form of a cylindrical casing and the reservoir and discharge ports are in alignment and diametrically opposed also, the cylinder block is cylindrical in form and fits neatly within the cylindrical housing. Furthermore, the pumping cylinder extends diametrically through the cylinder block and thus one end of the pumping cylinder communicating with the reservoir port may be brought into communication with the discharge port by rotating the cylinder block through 180° about its longitudinal axis. In that event, the other end of the pumping cylinder may also function in that the expulsion of a charge of material through the discharge port at one end of the pumping cylinder simultaneously draws a further charge into the other end of the pumping cylinder.

By way of example, an embodiment of the invention is described hereinafter with reference to the accompanying drawings.

FIG. 4 is a sectional view taken on line 4—4 of FIG. 3.

FIG. 5 is a sectional view taken on line 5—5 of FIG. 3.

Figure 1:
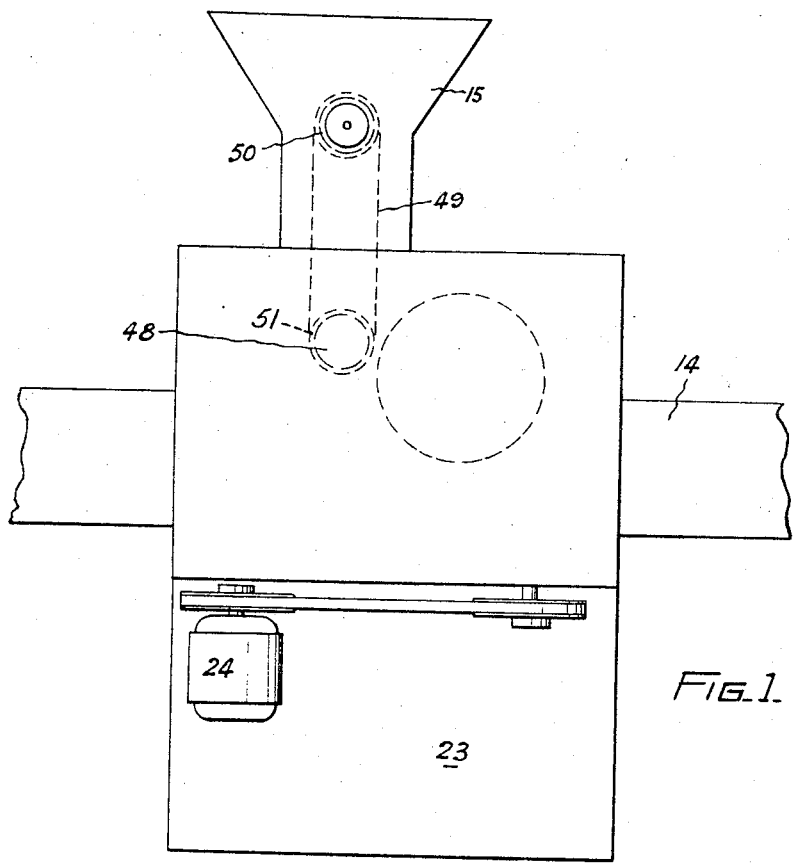
FIG. 1 is a front elevation of a depositor according to the invention.
Figure 2:
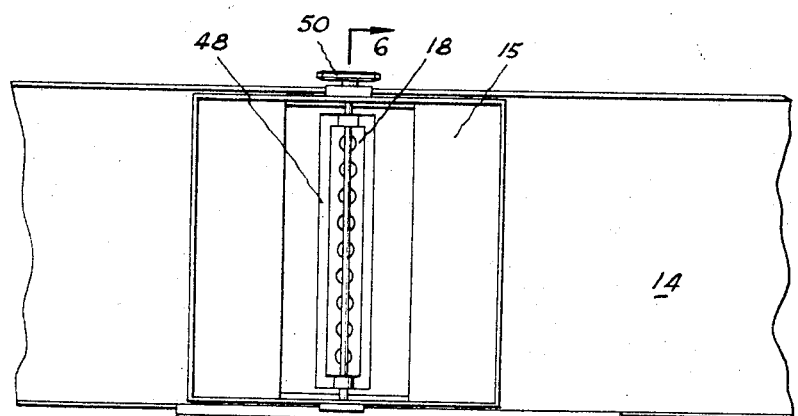
FIG. 2 is a plan view of the depositor of FIG. 1.
Figure 3:
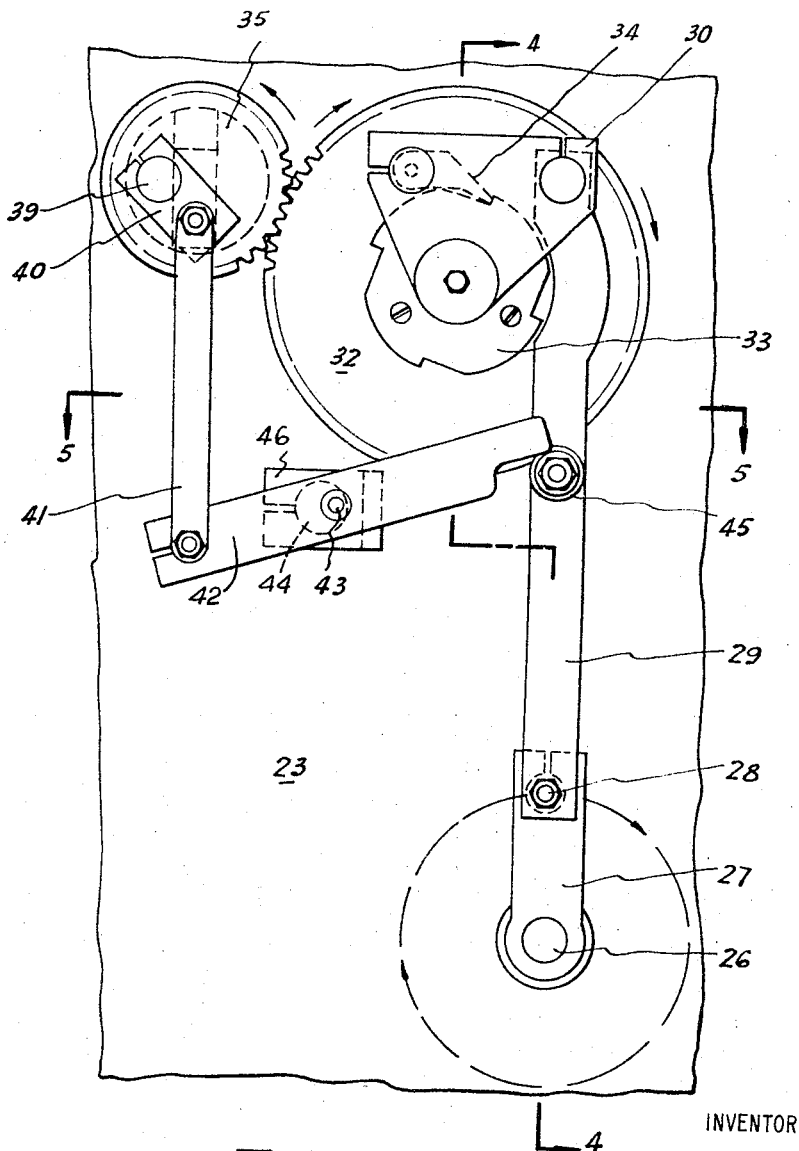
FIG. 3 is a detail view taken on line 3—3 of FIG. 2 and drawn to a larger scale.
Figure 6:
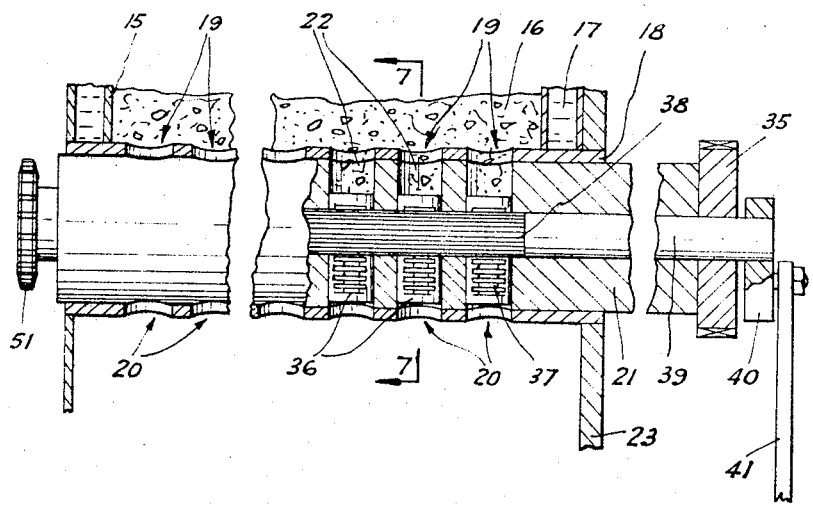
FIG. 6 is a longitudinal sectional view taken on line 6—6 of FIG. 2 and drawn to a larger scale.
Figure 7:
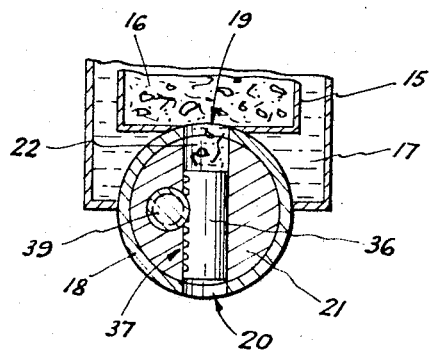
FIG. 7 is a sectional view taken on line 7—7 of FIG. 6.

The illustrated depositor is shown in FIGS. 1 and 2 in association with a confectionery mould conveyor 14 of conventional form whereby a sequence of multi-cavitied moulds may be progressed beneath the discharge ports of the depositor so that each cavity receives a charge of confectionery material. It will be apparent that the movement of the conveyor 14 must be synchronized with the operation of the depositor and such synchronized operation may be effected by any convenient and conventional means. As the conveyor and the means to operate it may be conventional and may take many forms, and as they do not constitute a part of the present invention, they are not illustrated in detail nor described further hereinafter.

The depositor is provided with a hopper type reservoir 15 adapted to hold a supply of semi-solid confectionery material 16 which may include solid particles or fragments. Preferably the reservoir 15 is double-walled to provide a jacket space through which warm water 17 or other heating medium may be circulated, if necessary, to maintain the material 16 in a semi-solid condition.

A stationary ported element in the form of a cylindrical casing 18 is secured to the bottom of the reservoir 15 and extends longitudinally thereof. The curved wall of the casing 18 is pierced by a plurality of reservoir ports 19 communicating with the interior of the reservoir 15 and a similar number of discharge ports 20 disposed so that there is a discharge port 20 diametrically opposite each reservoir port 19.

A cylindrical cylinder block 21 is a neat sliding fit within the casing 18 and is pierced by a plurality of pumping cylinders 22 each of which extends diametrically through the cylinder block 21 such that one cylinder 22 is disposed between each reservoir port 19 and its opposite discharge port 20.

The above described components of the illustrated example of the invention are supported upon a machine frame in the form of a cabinet or pedestal 23 which may also support the block moving means comprising a driving motor 24, a gear box 25, belt or otherwise drive connected to the motor 24 with an output shaft 26, a crank arm 27 on the shaft 26, a crank pin 28 on the arm 27, a connecting rod 29, of which one end is pierced by the pin 28, a rotatably mounted pawl carrier 30 pivotally connected to the other end of the rod 29, a gear wheel 32 able to turn upon a lay shaft 31 which also carries the carrier 30, a four toothed ratchet wheel 33 coaxially to the gear wheel 32, a driving pawl 34 rotatably mounted on the pawl carrier 30 and resiliently loaded by means of a loading spring or by virtue of its own weight into engagement with the ratchet wheel 33 and a pinion 35 fixed to the cylinder block 21.

From the foregoing it will be seen that rotation of the motor 24 causes rotation of the crank arm 27 and thus reciprocation of the connecting rod 29 which, in turn, produces rotary oscillation of the pawl carrier 30 thereby producing intermittent rotation of the gear wheel 32 in steps each of a quarter of a revolution. The pinion 35 is half the size of the carrier wheel 32 and thus each quarter revolution of the carrier wheel 32 causes a half revolution of the pinion 35 and cylinder block 21.

Pumping pistons 36 are provided, one within each pumping cylinder 22. The pumping pistons 36 are shorter than the pumping cylinders 22 so that each pumping cylinder may accommodate its pumping piston and a charge of the material 16 be deposited.

Piston operating means to shift the pumping pistons 36 from end to end of the pumping cylinders in a synchronized fashion with respect to the intermittent rotation of the cylinder block 21 are provided and may comprise rack teeth 37 formed in each piston 36 enmeshed with teeth 38 on a pinion shaft 39 extending through a bore in the cylinder block 21 parallel to the longitudinal axis thereof.

The piston operating means also comprise a second crank arm 40 pivotally connected to one end of a drag link 41, the other end of which is pivotally connected to one end of a rock lever 42. The rock lever 42 is fulcrumed intermediate its ends on a fulcrum pin 43 extending from a fulcrum pin carrier 44, and the other end of the rock lever 42 is adapted to be lifted from time to time by contact with a lifting roller 45 rotatably mounted on the connecting rod 29.

For preference, the fulcrum pin carrier 44 is circular and is clamped within a split mounting block 46 and the fulcrum pin 43 is eccentrically disposed with respect to the carrier 44. Thus after loosening a clamping screw 47 the carrier 44 may be rotated so as to alter the position of the fulcrum pin 43 thereby permitting adjustment of the stroke of the drag link 41 and thus of the pumping pistons 36.

If desired, a rotary paddle or beater 48 may be provided to agitate the contents of the hopper 15, and may conveniently be driven by means of an endless transmission chain 49 riding about a sprocket 50 fixed to the beater 48 and a similar sprocket 51 fixed to the cylinder block 21.

Figure 8:
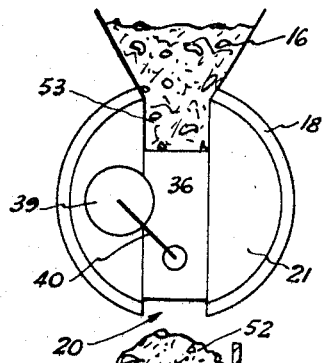
FIGS. 8–13 are diagrammatic views similar to FIG. 7 illustrating the depositor of the earlier figures at various stages in its cycle of operations.
Figure 9:
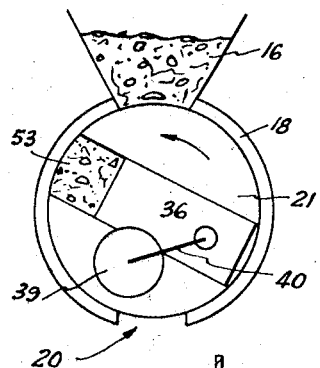
Figure 10:
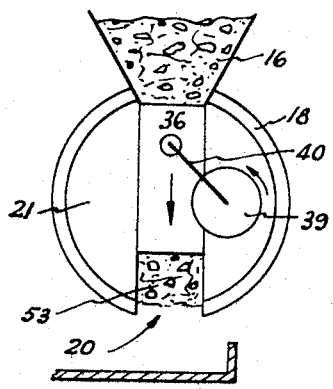
Figure 11:
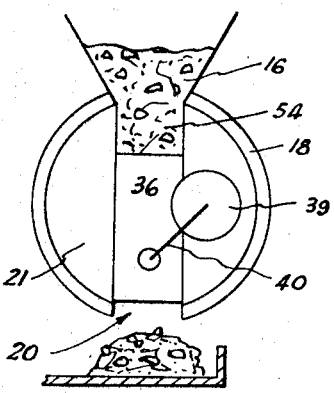
Figure 12:
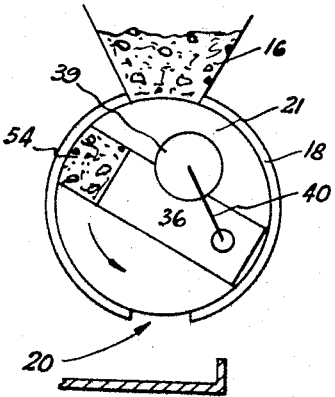
Figure 13:
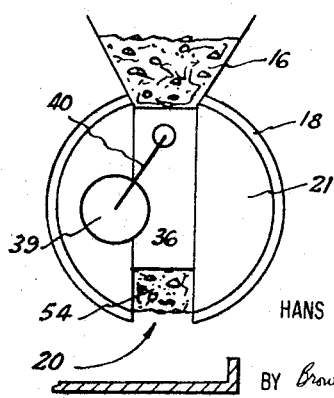

The operation of the illustrated embodiment of the invention now being described may best be understood with reference to FIGS. 8–13. FIG. 8 illustrates a starting point of a cycle of operations wherein first charges of material 52 have been deposited due to a downward motion of the pumping cylinders 36 and second charges of material 53 have been drawn into the pumping cylinders. FIG. 9 illustrates the next occurring motion, namely that of a half revolution rotation of the cylinder block 21, which is completed when the cylinder block arrives at the position illustrated by FIG. 10. It will be noted that the half revolution of the cylinder block 21 not only transfers the second charges 53 from the reservoir ports to the discharge ports but also inverts the position of the second crank arm 40 so permitting the next downward movement of the drag link 41 to deposit the second charges 53 and drawn in third charges 54. A further rotation of the cylinder block 21 through a half revolution (as shown occurring in FIG. 12) brings the cylinder block and the components which move with it to the position illustrated in FIG. 13 from which it can be seen that a next downward movement of the drag link 41 will cause the third charges 54 to be deposited and fourth charges to be drawn into the pumping cylinders. Thus, the situation of FIG. 8 has been arrived at and the cycle may repeat indefinitely.

As indicated earlier, depositors according to the invention may vary considerably from the illustrated embodiment described above. For example, although it is preferable for the motion of the cylinder block to be unidirectional and such that both ends of the pumping cylinder are used it is not essential. Indeed, the motion of the cylinder block may be translational rather than rotational, so long as the characteristic feature, namely that the charge of material drawn into the pumping cylinder is then transferred to the discharge port by way of bodily movement of the cylinder block, is retained.

I claim:

1. In an apparatus for depositing successive measured quantities of material from a reservoir containing a supply of the material, a housing having an inlet in communication with said reservoir and an outlet port, a cylinder block movably mounted within said housing, a dispensing cylinder formed in said cylinder block and defining opening in a surface of said cylinder block, means for moving said cylinder block between an intake position in which said dispensing opening is in communication with said inlet port and a discharge position in which said dispensing opening is in communication with said outlet port, a piston movably mounted within said cylinder, and piston operating means for moving said piston away from said dispensing opening when said cylinder block is in said intake position and toward said dispensing opening when said cylinder block is in said discharge position, the improvement wherein said piston operating means comprises rack teeth formed on a side surface of said piston, a pinion shaft having teeth formed on its outer surface, means mounting said pinion shaft for rotation about its longitudinal axis with the teeth thereon enmeshed with said rack teeth, and means for intermittently rotating said pinion to move said piston alternately toward and away from said dispensing opening.

2. In an apparatus according to claim 1, the further improvement wherein said housing has a cylindrical bore formed therein within which said cylinder block is rotatably mounted, said means moving said cylinder block being operable to intermittently rotate said cylinder block within said cylindrical bore.

3. In an apparatus according to claim 2, the further improvement wherein said means moving said cylinder block comprises ratchet means operably connected to said cylinder block for simultaneous rotation therewith, pawl means engaging said ratchet means, and reciprocably operable means for driving said pawl means to impart a rotary oscillatory movement to said ratchet means.

4. In an apparatus according to claim 2, the further improvement wherein said dispensing cylinder extends diametrically through said cylinder block, and wherein said inlet port is diametrically opposed to said discharge port so that rotation of said cylinder block during a half revolution shifts it from the intake position to the discharge position.

5. In an apparatus according to claim 4, the further improvement wherein said cylinder block moving means comprises a rotatably mounted pawl carrier, crank and connecting rod means for imparting rotary oscillatory movement to said carrier, a pawl on said carrier engaging a rotatably mounted ratchet wheel so that the rotary oscillatory movement of said carrier is converted into uni-directional intermittent rotation of the ratchet wheel, and means for transmitting the ratchet wheel motion to said cylinder block.

6. In an apparatus according to claim 4, the further improvement wherein said pinion is rotatably mounted within a bore in said cylinder block, said bore in said cylinder block extending in laterally offset, substantially perpendicular relation to said dispensing cylinder.

7. In an apparatus according to claim 6, the further improvement comprising means synchronizing the operation of said means to cause intermittent rotation to said pinion shaft and said means for rotating said cylinder block whereby rotation of said pinion shaft is accomplished during the dwell between intermittent rotation movement of said cylinder block.

8. In an apparatus according to claim 6, the further improvement wherein said means to cause intermittent rotation of said pinion shaft comprises a second crank means thereon, a rock-lever, means to rock said lever in concert with the intermittent rotation of said cylinder block, and a drag link connecting one end of said rock lever to said second crank means.

9. In an apparatus according to claim 8, the further improvement wherein the position of the fulcrum of said rock-lever is adjustable to adjust the stroke of said piston within said dispensing cylinder.

References Cited

UNITED STATES PATENTS

| 816,374 | 3/1906 | Pratt | 25—80 |
| 2,000,027 | 5/1935 | Kazanjian | 107—8.3 |
| 2,666,229 | 1/1954 | Vogt | 18—21 |
| 2,683,932 | 7/1954 | Steenhuis | 31—14 |
| 2,787,972 | 4/1957 | Vogt | 107—15.1 |
| 3,048,922 | 8/1962 | Steinkemper et al. | 31—44 |

WALTER A. SCHEEL, *Primary Examiner.*

A. HENDERSON, *Assistant Examiner.*

U.S. Cl. X.R.

17—32; 31—44